May 11, 1954 — L. W. RAINARD ET AL — 2,678,081
APPARATUS FOR MAKING CARPET UNDERLAY MATERIAL
Filed Aug. 24, 1951
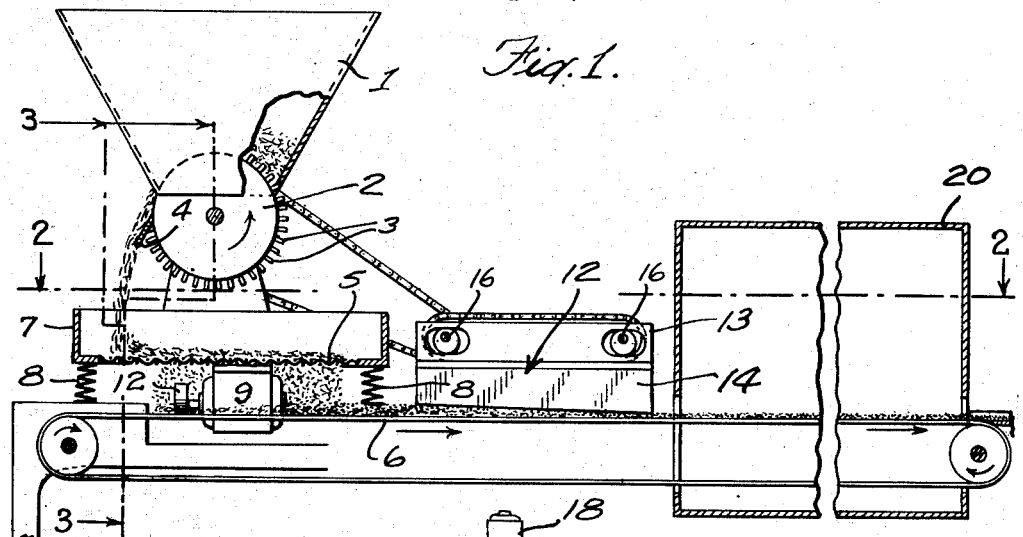
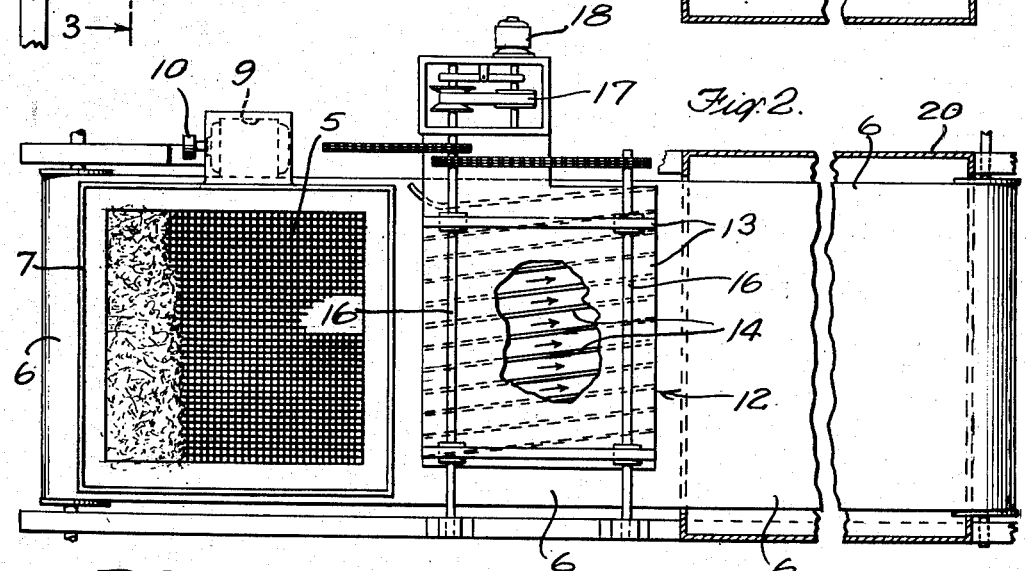
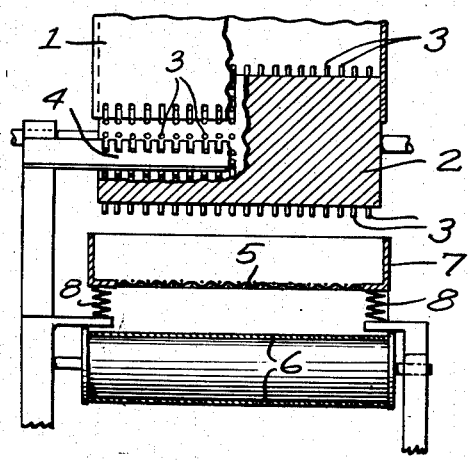
Inventors
LEO W. RAINARD
THOMAS F. JACOBY
By
Attorney Patented May 11, 1954

2,678,081

UNITED STATES PATENT OFFICE 2,678,081

APPARATUS FOR MAKING CARPET UNDERLAY MATERIAL

Leo W. Rainard, Nyack, and Thomas F. Jacoby, Yonkers, N. Y., assignors to Alexander Smith, Incorporated, Yonkers, N. Y., a corporation of New York Application August 24, 1951, Serial No. 243,410

3 Claims. (Cl. 154—1)

The present invention relates to resilient sheets to be used as cushioning underlays for carpets and to a method of making the same.

This application is a continuation-in-part of application Serial No. 151,054 filed March 15, 1950 for Carpet Underlay Material and Method for Making Same, now abandoned.

Carpet underlays have previously been prepared from a variety of resilient materials including fiber and rubber. Fibrous mats lack resiliency and dimensional stability. Rubber and rubber-like mats of the prior art require cellulation through the action of foaming or blowing agents to afford the required cushioning effect and are comparatively expensive, not only because of the cost of the materials that go to make up the underlays, but because of the nature of the process involved in their manufacture.

One object of the present invention is to utilize the ordinary commercial types of rubber scrap for the preparation of a carpet underlay and to produce thereby a highly satisfactory underlay product at a minimum of cost.

In accordance with the present invention the underlay is produced by sub-dividing scrap of natural or synthetic rubber into particles, mixing the rubber particles with a latex of natural or synthetic rubber, shaping the resulting mixture into a sheet of the desired thickness and density and permitting said latex to dry and form a binder for the scrap rubber particles.

As a result of the present invention, it is possible to utilize for the manufacture of underlays, waste materials which hitherto were not useful for this purpose and which furthermore are available in large quantities at low cost. Moreover, by employing various types of rubber scrap or by using the same type of scrap in various states of subdivision the physical properties of the product can be controlled over a wide range.

The sheet may be between ⅛ inch and ¼ inch according to the ingredients employed and the physical characteristics required. The resulting underlay product is a coherent elastic mass comprising rubber preformed particles secured together by a binder which itself is elastic.

Rubber scrap of the various types available, is first broken down or subdivided, by passing the scrap between closely set rollers as in a rubber mill or breaker mill to crack the material into a product having a particle size range and distribution such that it can be used without further treatment for the formation of the underlay. The product varies somewhat with the nature of the rubber. For example, a low gravity stock will be more finely divided than a high gravity stock. Such materials may be blended to vary the properties of the underlay.

The particle size of the subdivided rubber is mainly limited by the desired thickness of the pad and by the range of physical properties which are wanted in the finished product. Particles larger than the thickness of the pad will protrude from the surface and produce an uneven or bumpy surface. For example, for a mat ¼ inch thick, substantially none of the particles of the subdivided rubber scrap should have a dimension greater than ¼ inch. We have determined also that as the average particle size is decreased, the resulting pad becomes firmer and less compressible. We consider that this is due to the closer packing of the particles with fewer voids between them in which free movement can occur under the influence of the binder. We have found that rubber scrap, when cracked between rolls, is satisfactory for our purposes if less than 10% of the particles pass through a standard #60 wire screen (.0098" opening).

The latex is added in proportions which vary somewhat according to the nature of the latex used. In the following table we have given, on a solids basis, the working range and preferred amounts for a number of latices.

| | Range, Percent | Preferred Amount, Percent |
|---|---|---|
| Natural Rubber | 5-15 | 10 |
| Neoprene | 7.5-20 | 15 |
| GRS type III (butadiene-styrene, 45% styrene) | 10-25 | 20 |
| Dow Latex 513K (butadiene-styrene, 65% styrene) | 10-20 | 15 |

The proper amount of latex is added to rubber particles or crumbs in a suitable mixer such as a ribbon mixer, rotating pan mixer, or paddle mixer. These are commercially available types of mixers which give thorough mixing with a minimum amount of mechanical action, grinding or heat generation which would cause premature coagulation of the latex. For the same reason, the mixing cycle must not be continued any longer than is necessary to insure that each scrap particle is uniformly coated with a film of latex. The resulting mixture must then be formed into a continuous uniform sheet and dried or dried and cured.

A suitable apparatus for forming, drying and curing the sheet material is illustrated in the accompanying drawing in which:

Fig. 1 is a broken side elevation of an apparatus for carrying out the above process;

Fig. 2 is a horizontal section taken on the line 2—2 of Fig. 1;

Fig. 3 is a transverse vertical section taken on the line 3—3 of Fig. 1; and

Fig. 4 is an enlarged section through a layer of material.

Referring to the drawing, a hopper 1 is disposed to receive the rubber latex mixture formed according to the present invention. The scrap particles wetted with latex are transferred directly from the mixer to the feed hopper 1. The bottom of this hopper is fitted with a cylindrical roll 2 which rotates in the direction shown and sweeps out a layer of mixture with which it is in contact. This roller 2 carries a series of regularly spaced rows of pins 3 which protrude above its surface. The consistency of the rubber latex mixture is such that with the help of these pins a uniform layer of the mixture is carried from the hopper on the surface of the roll. Metallic fingers 4 strip the material from the surface of the roll and drop it into a vibrating screen 5 which breaks up the sheet formed by the roll 2 and distributes it uniformly on a moving conveyor 6.

The screen 5 is shown as mounted in a frame 7 on springs 8 and vibrated by a motor 9 driving an eccentric weight 10. Other vibrating means may be used however. The uniform mass thus formed must now be compacted and given the uniform surface and thickness required of an underlay. This is accomplished by a vibratory rake 12 having a metal frame 13 in which is set a series of oblique metal bars 14, the under surfaces of which are inclined in the direction of travel of the material so that the clearance between the bars and the conveyor is greater at the forward end than at the trailing end where it equals the desired thickness of the underlay.

The entire rake assembly moves up and down while the conveyor carrying the rubber mixture moves underneath. The rake 12 is shown as eccentrically mounted on shafts 16 which are driven by a belt 17 from a variable speed drive and motor 18. The spacing and inclination of the rake bars, and the frequency of their vibration are fixed in relation to the speed of the conveyor so that they act upon all portions of the rubber-latex mixture, continuously compacting it and leveling it so that when it passes out from under them it has the desired uniform thickness and density.

The sheet is then carried directly into a hot air oven 20 where it is dried or dried and cured.

The resultant underlay material is a coherent elastic mass which has special properties because of the manner in which it was formed. As shown in Fig. 4 the unshaded areas represent the rubber scrap particles. The shaded areas are intended to represent points or areas of contact between adjacent scrap particles. In the wet state there is an accumulation of latex at these points which when dried and cured forms a strong elastic bond. In addition, the mass is not continuous but contains voids or air spaces 21 where the scrap particles, because of their irregularity, are not in direct contact. This combination of many small bonds and open spaces permits the scrap particles to move with respect to each other when the mass is placed under stress and, added to the resiliency of the scrap itself, gives a very elastic, resilient structure which is not possible when the scrap particles are enclosed in a continuous matrix of binder as would be the case if a dry rubber binder were used.

Some scrap rubber stocks have odors which may be objectionable in an underlay material. However, it has been found that the odor is sealed off by the natural rubber binder. Residual odors, if any, in the scrap may be further masked with a small percentage of deodorant oil.

The following examples illustrate certain compositions embodying the invention:

Example I

A black rubber scrap consisting of #1 tire peels was given two passes through a two-roll breaker mill. After the second pass the product was sufficiently broken down and had the following size distribution:

| Screen-Openings | Percent |
|---|---|
| Left on screen with ½″ | 0.8 |
| Left on screen with ⅜″ | 0.8 |
| Left on screen with ¼″ | 5.2 |
| Left on #4 screen | 8.3 |
| Left on #7 screen | 22.2 |
| Left on #12 screen | 22.7 |
| Left on #30 screen | 31.5 |
| Left on #60 screen | 7.2 |
| Through #60 screen | 1.3 |
| | 100.0 |

The material larger than ¼″ was removed by screening and the remaining material was used to prepare the following mixture:

| | Parts |
|---|---|
| Milled scrap | 100. |
| Precured natural rubber latex (54% solids) | 18.6 |
| Water | 15.0 |

The additional water is added so that the liquid portion of the mixture will be sufficient to coat all the scrap particles to give a workable mass, while leaving no excess to drain off. Mixing was performed in a vertical planetary mixer with a wire cage stirrer and was continued for only a few minutes until the mass was uniformly mixed.

The wet rubber mixture was formed into a uniform ¼″ thick sheet using the mechanical sheet former above described and the wet sheet was then passed into a hot air oven where it was dried at 250° F. The pad was then ready for use.

Example II

A black rubber scrap similar to that used in the previous example was broken down and subdivided as in that example. The following mixture was prepared:

| | Parts |
|---|---|
| Milled scrap | 100. |
| GRS type III latex (38.25% solids) | 40. |
| Curing dispersion [1] | 4.8 |
| 20% casein | 4.1 |
| Water | 6. |

[1] Curing dispersion:

| | Parts |
|---|---|
| ZnO | 10.0 |
| S | 4.0 |
| Accelerator 552 (piperidinium pentamethylene dithiocarbamate) | 1.0 |
| Zenite (mercaptobenzothiazole) | 1.0 |
| Age rite white (Sym. Di betanaphthyl-para-phenylene-diamine) | 1.0 |
| Casein | 0.48 |
| Caustic soda | 0.20 |
| Darvan No. 1 (sodium salt of polymerized alkyaryl sulfonic acid) | 0.64 |
| Water | 13.66 |

The mixing and subsequent processing was carried out as in the previous example except that the wet pad was subjected to a temperature of 250° F. for two hours in order not only to dry the pad, but also to cure the binder.

Example III

A black rubber scrap consisting of molded goods trimmings with a density of 1.14 was broken down and subdivided as in the previous examples. It was used to prepare the following mixture:

| | Parts |
|---|---|
| Milled scrap | 100. |
| Neoprene latex type 842A (42% solids) | 23. |
| Curing dispersion [1] | 3.6 |
| 15% casein | 8.0 |

[1] Curing dispersion:

| | Parts |
|---|---|
| ZnO | 11.0 |
| Neozone D (phenyl-beta-naphthylamine) | 3.0 |
| Polyac (poly para-dinitroso-benzene) | 3.0 |
| Sulfur | 3.0 |
| Casein (15%) | 0.6 |
| Darvan #1 | 0.2 |
| Water | 12.5 |

The mixing and processing was carried out as before and the wet pad was cured for sixty minutes at 285° F.

Example IV

A vulcanized rubber scrap broken down by milling as in the previous example was mixed as follows:

| | Parts |
|---|---|
| Milled scrap | 100. |
| Dow 513K latex (46% solids) | 30. |
| 20% casein solution | 3.7 |

After mixing and sheeting out, the product was dried at 250° F. and was then ready for use.

In Examples II, III and IV the casein is added to the formulation because these particular latices require stabilization in order to prevent coagulation by mechanical action during mixing and sheet forming.

The resulting underlay will have the necessary elasticity, permanency and cushioning property, will have a low weight per square yard (for a ¼" mat 6–8 lbs. per square yard) and will be rollable into a compact unit for storage or transportation purposes. The underlay will at the same time be comparatively inexpensive to manufacture.

While the invention has been described with particular reference to specific embodiments, it is to be understood that it is not to be limited thereto, but is to be construed broadly and restricted solely by the scope of the appended claims.

What is claimed is:

1. Apparatus for forming sheet material from an adherent mass which comprises a hopper to receive a supply of said mass, a discharge roller disposed below said hopper and forming a bottom closure therefor, a plurality of pins disposed in annular areas over the surface of said roller with annular channels therebetween, stripping fingers disposed in said channels to strip from said roller the sheet of material picked up from said hopper by said pins, a vibrating screen disposed to receive said material from said stripping fingers, a traveling conveyor disposed to receive the material passing through said screen, and a set of inclined scrapers disposed over said conveyor to form the material thereon into a layer of uniform thickness.

2. Apparatus as set forth in claim 1 in which said scrapers constitute inclined bars forming a rake and means provided to vibrate said rake.

3. Apparatus as set forth in claim 2 in which said bars are inclined downwardly in the direction of movement of said conveyor.

References Cited in the file of this patent

UNITED STATES PATENTS

| Number | Name | Date |
|---|---|---|
| 807,753 | Loria | Dec. 19, 1905 |
| 1,461,337 | Weiss | July 10, 1923 |
| 1,597,808 | Lahey | Aug. 31, 1926 |
| 1,755,618 | Watzl | Apr. 22, 1930 |
| 1,963,339 | Sylvester | June 19, 1934 |
| 2,088,407 | Dales et al. | July 27, 1937 |
| 2,147,362 | Bloomberg | Feb. 14, 1939 |

FOREIGN PATENTS

| Number | Country | Date |
|---|---|---|
| 438,868 | Great Britain | Feb. 19, 1934 |
| 437,399 | Great Britain | Oct. 29, 1935 |
| 451,023 | Great Britain | July 24, 1936 |